United States Patent Office.

LOUIS HARMYER, OF CINCINNATI, OHIO.

Letters Patent No. 73,246, dated January 14, 1868.

---

IMPROVED COMPOSITION FOR PRESERVING WOOD, METAL, CANVAS, &c.

---

*The Schedule referred to in these Letters Patent and making part of the same.*

---

TO WHOM IT MAY CONCERN:

Be it known that I, LOUIS HARMYER, of Cincinnati, Ohio, have invented a new, useful, and improved Composition of Matter.

This composition is composed of tar, rosin, sulphuric acid, copperas, salt, alum, lime, and carbon iron.

These articles I compound in the following proportions, and in the following manner; that is to say, take one barrel of tar, put it in a kettle, and boil it for half an hour; then take ten (10 lbs.) pounds pulverized rosin, and mix with the tar, and boil until the rosin is dissolved; then mix carefully with the tar and rosin two and a half (2½ lbs.) pounds of sulphuric acid; then add and mix with like care ten (10 lbs.) pounds of pulverized copperas, six (6 lbs.) pounds salt, six (6 lbs.) pounds pulverized alum, sixty (60 lbs.) pounds lime, and two (2 lbs.) pounds carbon iron, and the composition is complete.

A smaller or larger quantity can be compounded by using substantially the same relative proportions. This composition is of great value for the preservation of wood, metal, canvas, leather, paper, &c., &c., and, mixed with another composition, hereinafter described, may be used as a pavement for streets and walks, and, mixed with two articles, hereinafter described, makes a superior dark sealing-wax.

Having described the manner and process of compounding it, I now proceed to describe the manner of using the same.

Blocks or pieces of wood, or wooden structures, are greatly benefited by the use of this composition. The blocks should be saturated with hot composition. Where that cannot well be done, the composition may be put upon blocks, and upon structures, warm, with a brush. On metal, it should be put on in a warm day, or, better, in a warm room, with a brush. Canvas soaked in it for a few minutes, then rolled and dried. Leather may be painted with it warm. Better to soak it, say, for fifteen minutes, in warm composition, then rolled and dried in a warm room, and rubbed with rags. Paper and pasteboards for roofing, or for many other purposes, should be saturated with hot composition, and then rolled through rollers. Brick and stone may be soaked in hot composition, or the hot composition may be put on with a brush, &c.

This composition makes wood water-proof and air-tight, &c. On metal roofing, &c., it is proof against the corroding effects of rain and atmospheric changes. It renders canvas water-proof. So also of leather, paper, and pasteboard, and, for roofing with paper, is superior to any composition in use.

For a pavement, the composition should be made hot. Then, to one barrel of composition, add one and a half barrel of pulverized rosin, one and a half barrel of lime, and dry fine gravel enough to make it nearly a dry substance. Then put it down hot, and put marble-dust upon it.

To make sealing-wax, take one pound of composition, make it hot, and add two pounds of pulverized rosin and half a pound of pulverized chalk.

This composition may be used for many useful purposes other than those specified. As a general rule, it should be used warm. Where the article to which it is to be applied cannot be soaked in it, the composition may be painted upon it.

Having thus described the nature of my invention, the manner of compounding and using the same, I now state that I claim as my invention—

The composition itself, and the manner and process of compounding and using the same, substantially as herein set forth.

LOUIS HARMYER.

Witnesses:
J. C. FAY,
E. GILLIGAN.